United States Patent

Cooley et al.

[11] Patent Number: 5,468,708
[45] Date of Patent: Nov. 21, 1995

[54] GROUP VIII METAL CATALYST COMPOSITION

[75] Inventors: Neil A. Cooley, Teddington; Adrian P. Kirk, Surbiton, both of England

[73] Assignee: BP Chemicals Limited, London, England

[21] Appl. No.: 222,465

[22] Filed: Apr. 1, 1994

[30] Foreign Application Priority Data

Apr. 6, 1993 [GB] United Kingdom .................... 9307207
Nov. 30, 1993 [GB] United Kingdom .................... 9324583

[51] Int. Cl.$^6$ .............................. B01J 31/26; B01J 31/24
[52] U.S. Cl. ........................... 502/162; 502/207; 502/213
[58] Field of Search ............................ 502/207, 213, 502/162

[56] References Cited

U.S. PATENT DOCUMENTS 4,822,871  4/1989  Klingensmith .
5,143,873  9/1992  Bryndza et al. ..................... 502/162
5,145,823  9/1992  VanLeeuwen et al. .

FOREIGN PATENT DOCUMENTS 246683  4/1987  European Pat. Off. .

*Primary Examiner*—Asok Pal
*Attorney, Agent, or Firm*—Fay, Sharpe, Beall, Fagan, Minnich & McKee

[57] ABSTRACT

Catalyst compositions for preparing polyketones comprising (a) a Group VIII metal compound, containing at least one ligand capable of coordinating to the Group VIII metal, and (b) a boron hydrocarbyl compound are disclosed, in particular catalyst compositions wherein the boron hydrocarbyl compound is a Lewis acid of the formula BXYZ where at least one of X, Y and Z is a monovalent hydrocarbyl group. A preferred catalyst composition comprises a palladium complex and $B(C_6F_5)_3$.

7 Claims, No Drawings

GROUP VIII METAL CATALYST COMPOSITION

BACKGROUND OF THE INVENTION

The present invention relates to novel catalyst compositions suitable for use in preparing polyketones.

It is known to produce polyketones, which are linear alternating polymers of (a) one or more olefins and (b) carbon monoxide, by a liquid phase process in which the olefin(s) and carbon monoxide are polymerised together in methanol, ethanol or propanol solvent in the presence of a palladium catalyst. Such a process, which is disclosed in more detail in for example EP 121965 and EP 314309, typically employs a catalyst derived from (a) a palladium compound (b) a source of an anion which is either non-coordinating or only weakly coordinating to palladium and (c) a bisphosphine of formula $R^1R^2P-R-PR^3R^4$ where $R^1$ to $R^4$ are independently aryl groups which can optionally be polar substituted and R is a divalent organic bridging group such as—$(CH_2)n$—(n=2 to 6). The source of the anion is typically its conjugate acid.

It is furthermore known from EP-A-246683 that polyketones can also be prepared if component (b) in the catalyst is replaced by tin chloride or germanium chloride. Such salts of a strong acid and a weak base are electron acceptors, and thus "Lewis" acids.

EP-A-508502 discloses catalyst compositions comprising:

a) a Group VIII metal compound,
b) a Lewis acid of the general formula $MF_n$ in which M represents an element that can form a Lewis acid with fluorine, F represents fluorine and n has the value 3 or 5, and
c) a dentate ligand containing at least two phosphorus-, nitrogen- or sulphur-containing dentate groups through which the dentate ligand can complex with the Group VIII metal.

A problem with the prior art catalyst compositions is to improve their reaction rate.

It has now been found that high reaction rates can be obtained using catalyst compositions based upon Group VIII metal compounds in conjunction with specific boron compounds.

SUMMARY OF THE INVENTION

According to the present invention there is provided a catalyst composition for preparing polyketones comprising:

(a) Group VIII metal compound, containing at least one ligand capable of coordinating to the Group VIII metal and
(b) a boron hydrocarbyl compound preferably a Lewis acid of the formula BXYZ where at least one of X Y and Z is a monovalent hydrocarbyl group.

A further advantage of the present invention is the ability to significantly reduce or totally eliminate the need to use protonic acids especially those having a low pKa e.g. less than 2 although small quantities of water can be tolerated. It is thought that if residual quantities of such acids are retained in the polyketone, the thermal stability of the polyketone is reduced.

The term polyketone is used herein to mean an interpolymer of one or more olefins with carbon monoxide. The idealised structure of such a material would be a polymer of strictly alternating olefin and carbon monoxide units. Although polyketones prepared according to the present invention correspond to this idealised structure, it is envisaged that materials corresponding to this structure in the main but containing small regimes (i.e. up to 10 wt %) of the corresponding polyolefin also fall within the definition.

Considering next the feedstocks for the polymerisation, it is believed that any source of carbon monoxide can be used. Thus the carbon monoxide may contain nitrogen, inert gases and hydrogen.

Any olefin can in theory be used although the best reaction rates are obtained when either ethylene or a mixture of olefins which include ethylene, e.g. ethylene/propylene, ethylene/butylene, ethylene/hexene and the like, is used. The lower rates obtained in the absence of ethylene should not be construed as indicating that the process can be used only with any ethylene feedstock since other olefins such as propylene, 4-methylpentene-1, styrene, acrylates, vinyl acetates and the like all undergo reaction to some extent.

DESCRIPTION OF THE PREFERRED EMBODIMENTS

The catalyst compositions of the present invention comprise a Group VIII metal compound. The Group VIII metals are iron, cobalt, nickel, ruthenium, rhodium, palladium, osmium, iridium and platinum. Palladium is particularly preferred as the Group VIII metal.

The Group VIII metal compound also contains at least one ligand capable of co-ordinating to the Group VIII metal. Examples of such ligands are phosphorus-, arsenic-, antimony-, nitrogen-, and sulphur-donor ligands, preferably phosphorus-donor ligands e.g. phosphines, phosphinites, phosphonites or phosphites, preferably phosphines. Where phosphines are used, these can be mono-dentate or bidentate. Useful monodentate ligands are of the formula $PR_1R_2R_3$ where $R_1R_2$ and $R_3$ are independently an optionally substituted alkyl or aryl group e.g. $C_1-C_6$ alkyl, phenyl, anisyl, tolyl. It is preferred that $R_1=R_2=R_3$; preferred monodentate phosphines are $PPh_3$, $PMe_3$, $PEt_3$ and $P(n-Bu)_3$. Alternatively bidentate phosphines can be used especially phosphines of the formula $R_4R_5P-R_8-PR_6R_7$ where $R_4$, $R_5$, $R_6$ and $R_7$ may be the same or different and all have the same definition as the groups $R_1$, $R_2$, $R_3$, and $R_8$ is a divalent organic group such as—$(CH_2)_n$—where n=2 to 6. Examples of such bidentate phosphine are 1,3-bis (diphenylphosphino)propane (dppp); 1,2-bis(diphenylphosphino) ethane (dppe); 1,4-bis(diphenylphosphino)butane (dppb) and 1,3-bis[bis(2-methoxyphenyl)phosphino]propane.

The Group VIII metal compound containing such a ligand can be added to the reaction medium either in a preformed state or it can be generated in situ by adding a Group VIII metal precursor and the ligand separately, preferably simultaneously. Such Group VIII metal precursors would suitably be simple binary compounds e.g. palladium chloride, palladium acetate. A preferred group VIII metal compound is Pd(PP)(acetate)$_2$ where PP is a bidentate ligand as defined above e.g. dppp.

In addition to the ligand capable of co-ordinating to the Group VIII metal, the Group VIII metal compound will preferably comprise other groups bonded to the Group VIII metal; these groups may derive from any Group VIII metal precursors that have been used in generating the Group VIII metal compound. Such groups are suitably halides, especially chloride; acetate, trifluoroacetate, tosylate, nitrate, sulphate, acetylacetonate, cyanide, preferably acetate.

In addition to the Group VIII metal compound, the catalyst compositions of the present invention also comprise a boron hydrocarbyl compound for example a boron alkyl or boron aryl compound. In particular the Boron hydrocarbyl compound can be a Lewis acid of the formula BXYZ where at least one of X Y and Z is a monovalent hydrocarbyl group. Where any one of X Y or Z is a monovalent hydrocarbyl group, it is suitably an alkyl for example a $C_1$–$C_6$ alkyl group, or an aryl group for example, a substituted or unsubstituted phenyl group for example $C_6H_5$ or $C_6F_5$. Other suitable monovalent hydrocarbyl groups are m,m-$C_6H_3(CF_3)_2$, $CF_3$ and $C_2F_5$. It is to be understood that two or three of the groups X, Y and Z can together form bi or trivalent groups respectively. At least one of X, Y and Z is a monovalent hydrocarbyl group; however, it is preferred that at least two, preferably three, of X, Y and Z are each monovalent hydrocarbyl groups. Suitable examples of such Lewis acids are $BMe_3$, $BEt_3$, $B(C_6H_5)_3$, $B[mm-(CF_3)_2C_6H_3]_3$, $B(mesityl)_3$, $B(p-FC_6H_4)_3$, $B(m-CF_3C_6H_4)_3$ and $B(C_6F_5)_3$, preferably $B(C_6F_5)_3$. Where one or more of X, Y and Z is not a hydrocarbyl group, it is suitably a OH, OR or halide group preferably a halide group for example fluoride, chloride or bromide especially fluoride. Examples of compounds where one of X, Y, Z is a group other than a hydrocarbyl group are boronic acids of the formula $RB(OH)_2$ where R is a hydrocarbyl group e.g. $PhB(OH)_2$, and hydrocarbyl 1,3,2-benzodioxaboroles.

Other suitable boron hydrocarbyl compounds for use in this invention are borate salts of the formula $MBR_4$ where M is an alkali metal e.g. Li, Na, and R is a hydrocarbyl group e.g. $C_6H_5$, $C_6F_5$ and substituted analogues. For example a suitable compound could be $LiB(C_6F_5)_4$ or $NaB(C_6H_5)_4$.

The boron hydrocarbyl compound for example the Lewis Acid BXYZ is added to the reaction medium in an amount such that the Group VIII metal: Boron ratio is in the range 10:1 to 1:200 preferably 1:1 to 1:100 more preferably 1:5 to 1:70 e.g. 1:50.

The catalyst compositions can be used in either the gas-phase or the liquid-phase. It is to be understood that the term liquid phase also includes slurry-phase where the polyketone product is insoluble in the reaction solvent. Where the catalyst compositions are used in the liquid phase, any suitable solvent can be used. Examples of such solvents are ketones (e.g. acetone), ethers, glycol ethers, chlorinated solvents (e.g. chloroform, dichloromethane), hydrocarbon solvents (e.g. cyclohexane, toluene), methanol and ethanol. A particularly preferred solvent is any olefinically-unsaturated hydrocarbon especially where such a hydrocarbon is also a reactant in the polymerisation reaction. Examples of such olefinically-unsaturated hydrocarbons are $C_3$–$C_{10}$ olefins (preferably $C_3$–$C_6$ olefins e.g. propylene, n-butene, isobutene, and n-hexene) and styrene. A preferred olefinically-unsaturated olefin as solvent is propylene. It is a feature of the present invention that non-alcoholic solvent systems can be used where necessary. Alcohol impurities in the final polymer can be undesirable where the polymer is to be used for food packaging since alcohols are usually toxic. The solvents may contain small quantities of water for example up to about 0.5% wt/wt. Where the reaction is carried out in the gas phase, small quantities of water may be added. Where water is present, it is preferably present in an amount of at least 4 moles per mole of boron.

The polymerisation process is suitably carried out at a temperature in the range 20° to 150° C. preferably 50° to 120° C. and at elevated pressure, (e.g. 1 to 100 bars). The over pressure of gas is suitably carbon monoxide or carbon monoxide and olefin, if the olefin is gaseous under the reaction conditions. It is possible to operate the polymerisation process either batchwise or continuously.

In a further aspect of the present invention there is provided a polyketone wherein at least 30, preferably at least 40 more preferably about 50 mole % of the end groups are aryl or substituted aryl groups for example phenyl or substituted phenyl preferably $C_6F_5$ groups.

The following Examples illustrate the present invention.

EXPERIMENTAL

Toluene and diethylether were distilled from sodium. Dichloromethane was distilled from calcium hydride.

$pd(pph_3)_2(COCH_3)Cl$ was prepared in 97% yield by the addition of acetyl chloride to $Pd(PPh_3)_4$ according to the method described by Fitton et al, (Chem. Comm., 1968, 6.) $Pd(PPh_3)_4$ was synthesised according to the method described by Coulson (Inorganic Syntheses 1970, 13, 121).

EXAMPLE 1

(a) Preparation of $Pd(dppp)(COCH_3)Cl$ $Pd(PPh_3)_2(COCH_3)Cl$ (6.1319 g, 8.6 mmol), 1,3-bis-(diphenylphosphino) propane (dppp) (3.7711 g, 9.1 mmol) and toluene (100 $cm^3$) were mixed and the resulting mixture was stirred under nitrogen for 1 hour. Diethylether (100 $cm^3$) was added and the mixture was filtered. The solid product was washed with diethylether (20 $cm^3$) and dried in vacuo to give $Pd(dppp)(COCH_3)Cl$ (4.8521 g, 8.1 mmol). Yield= 94%.

(b) Polymerisation

Tris(pentafluorophenyl)boron, (0.0436 g, 0.085 mmol) was dissolved in dried, degassed dichloromethane (100 $cm^3$) and transferred to a 300 $cm^3$ Autoclave Engineers reactor under nitrogen. The stirred reactor contents were pressured to 45 barg with a 1:1 mixture of carbon monoxide and ethylene and heated to 70° C. A solution of $Pd(dppp)(COCH_3)Cl$ (0.0154 g, 0.026 mmol) in dried, degassed dichloromethane was added to the reactor and the pressure was adjusted to 50 barg by addition of 1:1 $CO/C_2H_4$. During the subsequent reaction, a pressure of 50 barg was maintained by the addition of 1:1 $CO/C_2H_4$. Three hours after the addition of the palladium complex to the reactor the reaction was stopped by cooling the mixture and venting the gaseous components. The alternating ethene/CO copolymer was collected by filtration and dried in vacuo. Yield=11.502 g. This represents a productivity of 1397 g/gPd/h.

EXAMPLE 2

(a) Preparation of $Pd(dppp)(OAc)_2$

Palladium acetate (1.000 g, 4.4563×$10^{-3}$M) was dissolved in HPLC-grade acetone (100 $cm^3$) and the solution was stirred for 2 hours and then filtered. To the filtrate a solution of dppp (1.8390 g) in HPLC-grade acetone (25 $cm^3$) was slowly added over a period of ½ hour. Soon after needle-like crystals began to form; diethyl ether (25 $cm^3$) was then slowly added and the mixture allowed to stand for ½ hour. The resultant pale-yellow precipitate was filtered, washed with toluene (5 ml) and dried in vacuo to give a $Pd(dppp)(OAc)_2$ (2.146 g).

(b) Polymerisation $B(C_6F_5)_3$ (0.2407 g) was weighed in air into a dried Schlenk tube and a solution in dried dichloromethane (100 $cm^3$) was prepared under nitrogen. This solution was then transferred to a 300 ml stirred autoclave and 25 g propene added.

The autoclave was then pressurised to 30 BarG with the reaction gas (premixed CO/C$_2$H$_4$, 50/50 v/v) and heated to 70° C.

A solution of Pd(dppp)(OAc)$_2$ (0.0154 g) in dried dichloromethane (10 cm$^3$) was injected into the autoclave, which was then pressurised to 50 BarG (the reaction pressure) with CO/C$_2$H$_4$.

The reaction was run for 1 h. and 22.495 g polyketone recovered. This represents a productivity of 8730 g/gPd/h.

We claim:

1. A catalyst composition for preparing polyketones comprising (a) a palladium compound containing at least one ligand capable of coordinating to the palladium, and (b) a boron hydrocarbyl compound.

2. A catalyst composition as claimed in claim 1 wherein the boron hydrocarbyl compound is a Lewis acid of the formula BXYZ where at least one of X, Y and Z is a monovalent hydrocarbyl group.

3. A catalyst composition as claimed in claim 2 wherein at 0 least one of X, Y and Z is a C$_1$–C$_6$ alkyl group or a substituted or unsubstituted phenyl group.

4. A catalyst composition as claimed in claim 2 wherein each of the groups X, Y and Z are the same.

5. A catalyst composition as claimed in claim 4 wherein X, Y and Z are each C$_6$F$_5$.

6. A catalyst composition as claimed in claim 1 wherein the palladium compound is a compound of the formula Pd(P P)(acetate)$_2$ where P-P is a bidentate phosphine.

7. A catalyst composition as claimed in claim 1 wherein the palladium boron ratio is in the range 1:5 to 1:70.

* * * * *